United States Patent

Haber

[11] 4,018,078
[45] Apr. 19, 1977

[54] CALIBRATION SYSTEM FOR MAGNETIC SWITCHES USED IN WRIST INSTRUMENTS

[76] Inventor: Terry M. Haber, 3197 Airport Loop Drive B, Costa Mesa, Calif. 92626

[22] Filed: Apr. 26, 1976

[21] Appl. No.: 680,154

[52] U.S. Cl. ............................................. 73/1 D
[51] Int. Cl.² ...................................... G01P 21/00
[58] Field of Search ............... 73/1 D, 1 F; 29/593; 200/61.45 M

[56] References Cited

UNITED STATES PATENTS 3,132,220   5/1964   Uri et al. ................. 200/61.45 M
3,636,622   1/1972   Schmitt ........................... 29/622

Primary Examiner—S. Clement Swisher
Attorney, Agent, or Firm—Ralph B. Pastoriza

[57] ABSTRACT

A method and apparatus for calibrating inertia operated magnetic switches of the type used in wrist watches is provided. The system involves moving the magnet in the switch along an upper bore of the switch body towards a conducting member normally bridging switch contacts at the opposite end of the body until a point of travel is reached at which the conducting member is lifted from the switch contacts to the magnet. The magnet is then sealed at this point of travel and is properly positioned for correct operation of the inertia switch.

4 Claims, 2 Drawing Figures

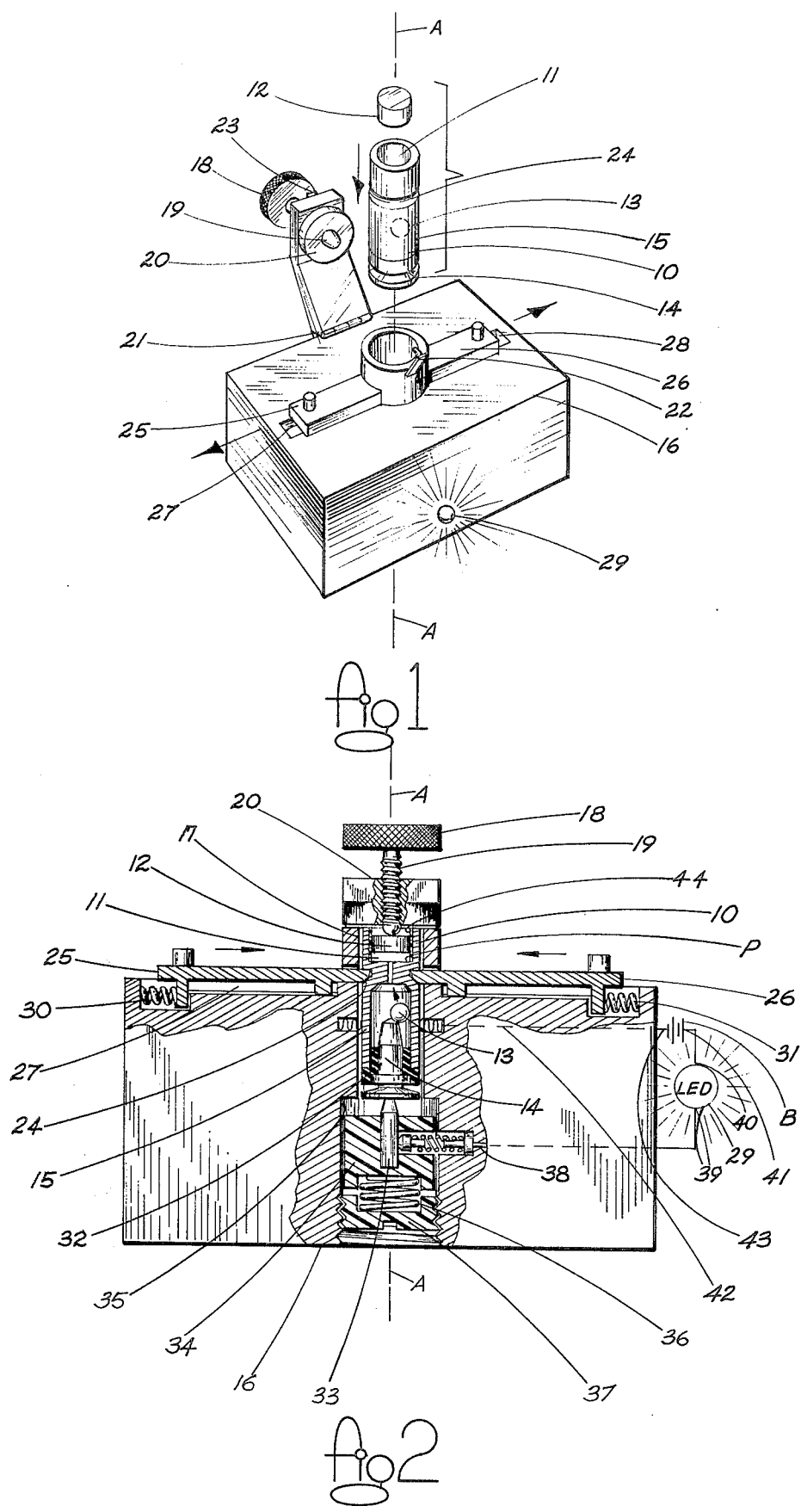

CALIBRATION SYSTEM FOR MAGNETIC SWITCHES USED IN WRIST INSTRUMENTS

This invention relates generally to calibrating systems and more particularly to a method and apparatus for calibrating magnetic switches used in wrist watches of the digital read-out type.

BACKGROUND OF THE INVENTION

Digital type wrist watches incorporating liquid crystals or light emitting diodes to provide the digital read-out are now well known in the art. All such watches, however, normally require a small push button on the side of the watch casing to illuminate the digital display when a person desires to tell the time. Since such operation requires the use of the wearer's other hand, more recent versions of the digital read out wrist watches have incorporated an inertia responsive switch which can be actuated by a flick of the wrist of the wearer to illuminate the display.

In my copending patent application Ser. No. 538,743 filed Jan. 6, 1975 and entitled ACCELERATION/DECELERATION ACTUATING MECHANISM FOR WRIST INSTRUMENTS now U.S. Pat. No. 3,946,173, there is described one of the inertia switches enabling illumination of a digital watch display by a flick of the wrist. The particular inertial switch as shown and described in this copending application incorporates a conducting member in the form of a ball normally held at one end of an elongated hollow switch body by a magnet. Switch contacts at the opposite end of the body are arranged to be bridged by the conducting ball when the wearer's wrist is flicked sufficiently to free the ball from the magnet.

In the mass production of digital watches incorporating an inertia switch of the foregoing type, it is very difficult to maintain uniform action of the particular inertial switch components. This difficulty primarily results from the fact that the magnets while made as uniform as possible do not always provide the same attractive force to the conducting member. Further, slight tolerances in the construction of the magnetic inertia switch body as well as the conducting member in the form of the ball can result in non-uniform action between various successive assemblies incorporated in wrist watches.

In view of the foregoing, a need has arisen to provide some method and means for calibrating each of the inertia switches prior to incorporation in a wrist watch to assure that each of the watches incorporating such switches will operate uniformly; that is, assure that the inertia switch will function in response to flicking or movement of the wearer's wrist. With such a calibrating system, quality control in the mass production of such watches can be assured.

BRIEF DESCRIPTION OF THE PRESENT INVENTION

With the foregoing considerations in mind, the present invention contemplates a novel method and apparatus for calibrating inertia switches of the magnetic type incorporated in digital read-out wrist watches in such a manner as to provide uniformity in their operation for successive watches all to the end that high quality control results.

More particularly, the foregoing desirable result of proper quality control is realizable by assuring that the magnetic field strength of each individual magnet in the inertia type magnetic switch acting on the conducting member in the form of the ball is precisely the same when the ball is in bridging engagement with the switch contacts.

Briefly, the magnetic switch body utilized in the inertia switches has an upper bore opening for receiving the magnet in question in a position in spaced relationship along an axis of the body coaxial with the bore from the switch contacts in the body adjacent its opposite end. The sudden acceleration and/or deceleration movement of the body in the direction of this axis frees the member from the magnet so that it will move in the direction of the axis and momentarily bridge the contacts.

In calibrating the foregoing type of switch in accord with the method of this invention, the following steps are taken:

First, the switch body is oriented with its end bore upwardly so that the referred to axis of the body is vertical with the magnet positioned in an upper portion of the bore and with the conducting member held in bridging engagement with the switch contacts by gravity.

Second, a signalling means is energized through a circuit including the switch contacts in series so that the signalling means remains energized so long as the conducting member bridges the switch contacts.

Third, the magnet is gradually urged downwardly along the axis towards the conducting member until a point of travel in the bore is reached at which the attractive force of the magnet lifts the conducting member from the switch contacts. This point of travel is clearly indicated by automatic deenergization of the signalling means in response to a lifting of the ball from the switch contacts.

By calibrating successive inertia switches to be inserted in successive watches in accord with the foregoing method, they will all be uniform inasmuch as the magnetic field strength acting on the conducting member or ball will be identical since in every instance this field strength is just sufficient to overcome the force of gravity acting on the ball.

BRIEF DESCRIPTION OF THE DRAWINGS

A better understanding of this invention as well as a preferred apparatus for carrying out the method will be had by referring to the accompanying drawings in which:

FIG. 1 is a perspective view of a calibrating apparatus showing a magnetic switch body in exploded view above the apparatus preparatory to being calibrated; and, FIG. 2 is a front elevational view partly broken away and partly in cross section of the magnetic switch body in the calibrating apparatus of FIG. 1 in the process of being calibrated.

DETAILED DESCRIPTION OF THE INVENTION

Referring first to FIG. 1 there is shown in exploded view a magnetic switch including a body 10 having an upper end bore 11 for receiving a magnet shown exploded above the end bore at 12. When the magnet 12 is positioned in the end bore 11, it functions to normally hold a conducting member such as a ball shown in dotted lines at 13 within the body 10 of magnetic material in spaced relationship, along an axis A—A of the body 10 coaxial with the bore 11, from switch contacts in the body adjacent its opposite end. A first of these switch contacts is indicated by the numeral 14 at the bottom end of the body 10 and the second constitutes a portion 15 of the side wall of the body 10.

The arrangement is such that a sudden acceleration and/or deceleration movement of the switch body 10 in the direction of the axis A—A frees the member 13 from the magnet so that it will move in the direction of the axis A—A and momentarily bridge the switch contacts 14 and 15 by engaging an inner end of the end contact 14 and the inside wall portion 15. Bridging of these switch contacts normally completes a circuit in the wrist watch to energize the illuminating means and render visible the digital display.

In calibrating the magnetic switches such as described in FIG. 1, there is provided a calibrating apparatus in the form of a housing 16 shown below the switch body 10 of FIG. 1. Housing 16 includes an upper vertical opening 17 for receiving and holding the body 10 in a fixed position with the axis A—A vertically oriented and its end bore 11 and magnet exposed at the top of the housing. In this position, the conducting member in the form of the ball shown in dotted lines at 13 is in bridging engagement with the switch contacts 14 and 15 in the lower opposite end portion of the body 10.

With the switch body oriented as described, and as will become clearer as the description proceeds, a moving means including a rotatable knob 18 having a threaded shaft 19 threadedly receivable in a threaded member 20 is positionable to engage the upper end of the magnet and gradually force the magnet downwardly relative to the body and housing along the bore 17. In this respect, the movable means is mounted as by hinge 21 to the housing and arranged to simply swing over the top of the upper opening 17 after the switch body 10 has been inserted in this opening. Rotation of the knob 18 will thread down the threaded shaft 20 to engage the magnet 12 in the upper bore 11 of the switch body to effect the desired gradual movement. In order to hold the described movable means over the opening 17 after it has been hinged about the hinge 21, there may be provided any suitable clamping means such as the swingable clamp 22 on the outside of the opening 17 and cooperating catch or flange 23 on the threaded structure supporting the shaft 19.

Proper indexing of the magnetic switch body 10 in a fixed position in the vertical opening 17 of the housing 16 is accomplished by providing an annular groove 24 circumferentially surrounding the body 10 with cooperating indexing means in the form of slide plates 25 and 26 on opposite sides of the vertical opening 17. These slide plates operate in tracks 27 and 28 in the top of the housing 16 and are arranged to move into opposite sides of the vertical opening 17 to engage within opposite portions of the annular groove 24 in the body 10.

In addition to the foregoing structure, the housing 16 mounts in a visible position a signalling means in the form of a light emitting diode 29 illustrated as energized in the showing of FIG. 1.

Referring now to FIG. 2, the foregoing components and their cooperation in effecting a calibration will become clear. Referring first to the upper portion of FIG. 2, the indexing means in the form of the slide members 25 and 26 with their opposed portions received within the annular groove 24 are clearly shown. In this respect, each of these slide members is biased inwardly towards the vertical axis A—A along the tracks 27 and 28 respectively as by small biasing springs or compression springs 30 and 31. By rounding the engaging portions, when the body 10 of the switch member is lowered into the vertical opening 17, the opposed slide members will snap into the groove when the body assumes a position in which the groove is opposed to these members. Consistent positioning of the body relative to the housing is thus assured.

In FIG. 2, the switch body 10 is shown partially in cross section wherein the conducting member in the form of the ball 13 is clearly visible in a position bridging the first and second switch contacts 14 and 15. In this respect, the first switch contact 14 is disposed in the end of the body 10 and held in insulated relationship from the wall portion 15 of the body 10 as by insulator insert 32. It will be evident that when the ball 13 bridges the switch contacts as shown in FIG. 2, a circuit is completed from the contact 14 to the wall portion 15 of the switch body.

The housing 16 includes a circuit means which includes the switch contacts 14 and 15 in series connected to energize the signalling means in the form of the light emitting diode 29 as by a source of electrical energy in the form of a battery B. This circuit means includes a pin 33 held within a plastic bushing 34 biased upwardly within a cylindrical opening 35 in the housing 16 as by a spring 36. With this arrangement, there is assured a proper electrical contact between the pin 33 and the first switch contact 14. The degree of pressure exerted by the biasing spring 36 on the pin 33 and thus the pressure on the electrical connection to the first contact 14 can be adjusted by means of the threaded insert 37 supporting the spring 36 receivable in the bottom of the housing 16.

A first conducting lead 38 connects from the pin 36 through a biasing connection as shown to one side 39 of the light emitting diode 29. The other side 40 of the light emitting diode 29 in turn connects to one side 41 of the battery B. A second conducting lead 42 in turn connects through a spring biased contact the wall portion 15 of the switch body to the other side 43 of the battery B.

In the actual embodiment, the battery B or other source and the various conducting leads 38 and 42 as described would be wholly incorporated in the housing with the light emitting diode mounted on the housing as illustrated in FIG. 1 so as to be visible.

Since the switch contacts 14 and 15 are bridged by the conducting member 13, the light emitting diode 29 will always be energized so long as such bridging is maintained. Because of the orientation of the switch body 10 in the housing, the conducting member or ball 13 will normally be held in bridging engagement with the contacts by gravity, the magnet 12 purposely being inserted in an upper portion of the end bore 11 of the switch body 10.

OPERATION

In operation, there may be provided a succession of calibrating apparatuses such as shown at 16 along a row with a corresponding number of quality control personnel operating each housing.

Initially, the knobs and shaft portions 18 and 19 of each housing are swung to the open positions as illustrated in FIG. 1 and an inertia switch to be calibrated dropped into the vertical openings 17 on the top of the housing 16. As described in conjunction with FIG. 2, indexing of the position of the body 10 in the housing will be effected by the slide members 25 and 26. The magnet 12 is initially positioned in an upper portion of the end bore 11 and the conducting member in the form of the ball 13 is held by gravity against the switch contacts all as described heretofore.

The operator will then swing the knob and shaft structure 18 and 19 over the vertical openings 17 so that the end of the shaft 19 engages the top of the magnet 12 as clearly illustrated in FIG. 2, the clamp and cooperating clamp flange 22 and 23 holding the structure in position.

The signalling means in the form of the light emitting diode 29 will be energized so long as the conducting member in the form of the ball 13 bridges the switch contacts 14 and 15.

The operator or calibrator will now gradually thread down the shaft 19 by rotating the knob 18 thereby forcing the magnet 12 along the axis A—A in the end bore 11. In this respect, it will be understood that the magnet 12 is a friction fit within the end bore 11 and towards this end there may be provided a sleeve lining 44 which will provide the proper friction against movement of the magnet 12. However, this friction is overcome by the threading down of the shaft 19 to gradually move the magnet 12 downwardly closer to the conducting ball 13.

When the magnetic member reaches a certain point of travel designated, by way of example, P in the bore 11, the attraction of the magnet or field strength will be such as to lift the conducting member or ball 13 from bridging engagement with the contacts to draw the ball upwardly towards the magnet. At this point of travel, the circuit means to the LED or signalling means will be broken since the switch contacts 14 and 15 are in series and are no longer bridged by the conducting ball. The light emitting diode 29 will thus be de-energized and no longer visible at which point the operator will cease the further downward movement of the magnet 12.

The particular magnetic switch is then properly calibrated in that the field strength exerted by the magnet on the conducting member 13 when the conducting member bridges the switch contacts is of a given value which will be consistent for each consecutive inertia switch calibrated in the manner described.

It will be understood, of course, that after the magnet 12 has reached the point of travel P, it will thereafter be permanently secured within the bore 11 and sealed appropriately.

The inertia switch is then ready for incorporation in a digital type wrist watch.

The spring biased pin arrangement 33 assures proper electrical contact between the circuit means in the housing 16 and the first switch contact 14, and as described, the contact pressure can be adjusted by the threaded insert 37.

If desired and as illustrated in FIG. 2, the sliders 25 and 26 may be provided with small knobs to permit manual retraction in removing the switch body 10 from the upper openings 17. However, the opposed portions of the sliders are rounded more gradually at their lower ends than at their upper ends and the sloping side walls of the annular groove are made shallower at their lower sides than at their upper sides as illustrated in FIG. 2 such that a simple upward movement of the body 10 will bias the slider members 25 and 26 apart to permit easy removal. On the other hand, the upper curved portions of the biased slide members 25 and 26 are made relatively sharp along with the upper side walls of the groove which extend in normally so that the body 10 is locked against downward movement in response to pressure on the magnet 12 by the knob shaft 19.

Of course, any appropriate indexing or locking means other than that shown could be used it being only important that each successive switch body to be calibrated be held in a fixed position during the calibration.

From the foregoing description, it will thus be evident that the present invention has provided a unique method and apparatus for calibrating inertia type magnetic switches for wrist instruments to assure proper quality control notwithstanding differences in individual magnetic field strengths of the magnets incorporated in such switches.

What is claimed is:

1. An apparatus for calibrating a magnetic switch including a body having an end bore for receiving a magnet in the upper portion thereof wherein said magnet normally holds a conducting member in spaced relationship, along an axis of said body coaxial with said bore, from switch contacts in said body adjacent to its opposite end such that a sudden acceleration and/or deceleration movement of said body in the direction of said axis frees the member from said magnet so that it will move in the direction of said axis and momentarily bridge said switch contacts, said apparatus including, in combination:
   a. a housing having an upper vertical opening for receiving and holding said body in a fixed position with its said axis vertically oriented and its end bore and magnet exposed at the top of said housing and with said conducting member held in bridging engagement with said switch contacts by gravity;
   b. a signalling device;
   c. a source of electrical energy for said signalling device;
   d. circuit means in said housing connecting said source of energy to said signalling device through said switch contacts in series so that said signalling device is continuously energized so long as said conducting member is bridging said switch contacts; and
   e. a threaded bore receiving a threaded shaft coaxially positioned over said end bore so that said shaft is positioned to engage the upper end of said magnet and upon rotation, gradually force said magnet downwardly relative to said body and housing along said bore towards said conducting member until a point in travel of said magnet along said bore is reached at which the attraction of said magnet lifts said conducting member from said switch contacts, said point of travel being indicated by de-energization of said signalling device
   whereby said magnet is then known to be properly positioned in said body for proper operation of said magnetic switch and can then be secured and sealed in said end bore of said body at said point of travel.

2. An apparatus for calibrating a magnetic switch including a body having an end bore for receiving a magnet in the upper portion thereof wherein said magnet normally holds a conducting member in spaced relationship, along an axis of said body coaxial with said bore, from which switch contacts in said body adjacent to its opposite end such that a sudden acceleration and/or deceleration movement of said body in the direction of said axis frees the member from said magnet so that it will move in the direction of said axis and momentarily bridge said switch contacts, said apparatus including, in combination:
- a. a housing having an upper vertical opening for receiving and holding said body in a fixed position with its said axis vertically oriented and its end bore and magnet exposed at the top of said housing and with said conducting member held in bridging engagement with said switch contacts by gravity, said body including an annular exterior circumferential groove lying in a plane normal to said axis of said body, said housing including indexing means on opposite sides of said upper vertical opening horizontally receivable in opposite portions respectively of said groove to thereby index said body to its said fixed position in said vertical opening;
- b. a signalling device;
- c. a source of electrical energy for said signalling device;
- d. circuit means in said housing connecting said source of energy to said signalling device through said switch contacts in series so that said signalling device is continuously energized so long as said conducting member is bridging said switch contact; and
- e. moving means coupled to said housing and positionable to engage the upper end of said magnet and gradually force said magnet downwardly relative to said body and housing along said bore towards said conducting member until a point in travel of said magnet along said bore is reached at which the attraction of said magnet lifts said conducting member from said switch contacts, said point of travel being indicated by de-energization of said signalling device whereby said magnet is then known to be properly positioned in said body for proper operation of said magnetic switch and can then be secured and sealed in said end bore of said body at said point of travel.

3. An apparatus according to claim 2, in which said switch contacts in said body comprise a first contact exposed at the end of said body opposite said end bore and a second contact constituting a wall portion of said body, said circuit means including a pin in said housing spring biased in the direction of said axis to engage said first switch contact, a first conducting lead in said housing connecting said pin to one side of said signalling means, the other side of said signalling means connecting to one side of said source of electrical energy, and a second conducting lead connecting the other side of said source of electrical energy to said wall portion of said body.

4. An apparatus according to claim 3, in which said signalling device comprises a light emitting diode visibly mounted to said housing.

* * * * *